UNITED STATES PATENT OFFICE.

GROSVENOR ATTERBURY, OF NEW YORK, N. Y.

ARTIFICIAL STONE.

1,163,060.  Specification of Letters Patent.  Patented Dec. 7, 1915.

No Drawing.  Application filed February 15, 1915.  Serial No. 8,206.

*To all whom it may concern:*

Be it known that I, GROSVENOR ATTERBURY, a citizen of the United States, residing in the city, county, and State of New York, have invented or discovered certain new and useful Improvements in Artificial Stone, of which the following is a full, clear, and complete disclosure.

My invention more particularly relates to an improved hydraulic cement composition so constituted that nails, tacks and screws may be driven therein after the mixture has thoroughly set and hardened.

The objects of my invention are to provide an artificial stone of this kind which will be permanent, strong and fire-proof, and which will readily unite or form a bond with ordinary concrete, and which will be so inexpensive as to adapt it for general use in construction work wherever an artificial stone, adapted to receive nails, tacks and screws, is desired, and particularly for use in surfacing concrete forms and structures to adapt such surface to receive nails, tacks and screws.

My invention will readily be understood from a description of the preferred way of practising it, which is as follows: I form a mixture of cement, preferably ordinary hydraulic or Portland cement, of asbestos fiber and of a filler having a porous or cellular texture, preferably cinders, crushed and screened to about one-quarter of an inch in size. A substantial amount of sand or finely crushed rock is preferably included in the mixture, and enough water is added to cause the cement to set. The semi-fluid or plastic composition is then cast in blocks for subsequent use, or is applied and allowed to set as an integral part of the structure under construction.

While the percentages of the several ingredients in the composition may be varied within wide limits, I prefer to make the composition substantially as follows: Hydraulic cement 100 parts; short asbestos fiber, known to the trade as fiber E, 23 parts, sand 133 parts, and crushed cinders 160 parts, all parts being by weight. Instead of using the short asbestos fiber, I may substitute a material known to the trade as rough asbestic or asbestos tailings, which is a material containing from 10 to 30 per cent. of asbestos fiber mixed with finely crushed rock and a certain percentage of unfibered asbestos. In using this material, I employ 100 parts of hydraulic cement, 156 parts of rough asbestic, and 160 parts of cinders, crushed and screened, all parts being given by weight. The ingredients must be intimately mixed, and this may be effected either wet or dry, by any suitable mixer, and in all cases sufficient water must be used to thoroughly set the cement.

The artificial stone produced by the mixtures described has a low specific gravity, only about 60 per cent. of that of ordinary concrete, and is cellular or full of minute voids, so that when nails, tacks or screws are driven therein, the material in the path of the nails, tacks or screws will be driven back into the voids sufficiently to admit the nails, tacks or screws without cracking or splitting the product. The cinders are particularly useful in giving to the product this cellular texture. The short asbestos fibers also assist in producing the porous cellular structure and in addition gives to the product a certain amount of tensile strength or resiliency and causes it to bite and hold a nail, tack or screw with sufficient grip for all practical purposes. The product, therefore, is distinguished from ordinary concrete artificial stone in that, after it has thoroughly set and hardened, it is cellular or porous to such an extent as to permit nails, tacks or screws to be driven into it, and, in addition, has sufficient tensile strength to enable it to grip and hold nails, tacks or screws. In addition to these characteristics, my composition unites or forms a bond with ordinary concrete and has all of the desirable properties of that composition.

In some cases, in practising my invention, I may use substitutes for the cinders in order to get the desired cellular texture in the product. Thus I may use finely crushed brick or fire-clay products having a cellular or porous texture, or even saw-dust, in cases where the product is not to be subjected to either fire or water. However, where cinders are available, I prefer them to any of the substitutes mentioned, as they are particularly suited for use in practising my invention.

Having described my invention, what I claim is:

1. An artificial stone of the kind described, comprising cement, asbestos fiber and cinders, and having a texture such that nails, tacks and screws may be driven therein.

2. An artificial stone of the kind described, comprising cement, asbestos and cinders in the proportions substantially as specified, and having a texture such that nails, tacks and screws may be driven therein, substantially as described.

3. An artificial stone of the kind described comprising cement, sand, asbestos fiber and cinders and having a texture such that nails, tacks and screws may be driven therein, substantially as described.

GROSVENOR ATTERBURY.

Witnesses:
JOHN W. PETERS,
E. A. McDERMOTT.

Copies of this patent may be obtained for five cents each, by addressing the "Commissioner of Patents, Washington, D. C."